Jan. 12, 1926.　　　　　　　　　　1,568,969
S. M. FAIRCHILD
CAMERA
Filed Oct. 11, 1919　　2 Sheets-Sheet 1
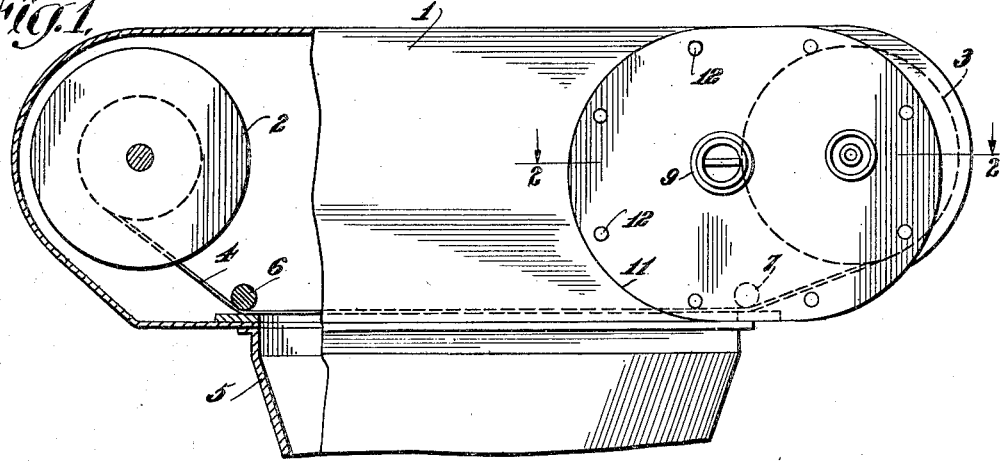
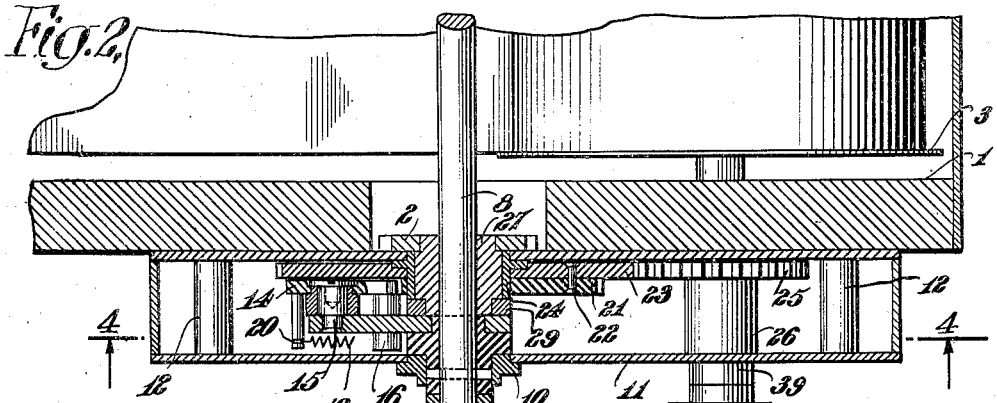
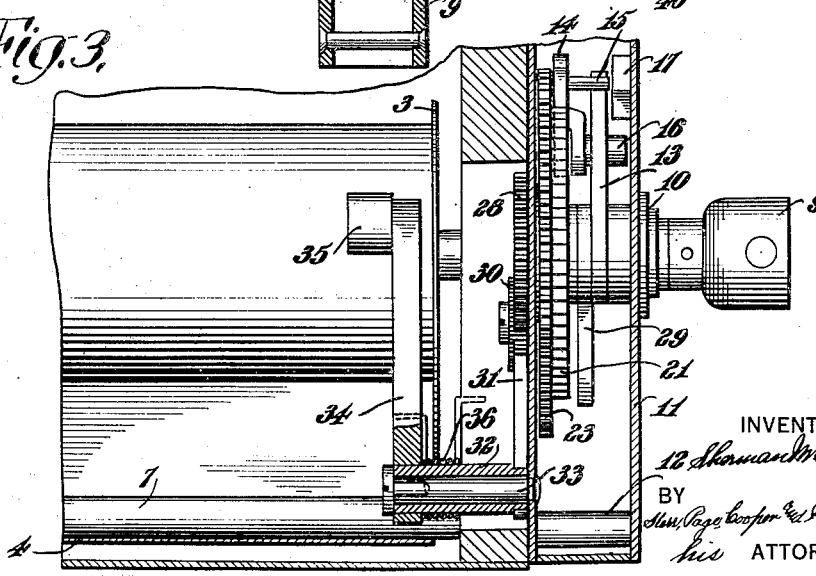
INVENTOR
Sherman M. Fairchild
BY
Kerr, Page, Cooper & Hayward
his ATTORNEYS Jan. 12, 1926.
S. M. FAIRCHILD
1,568,969
CAMERA
Filed Oct. 11, 1919    2 Sheets-Sheet 2
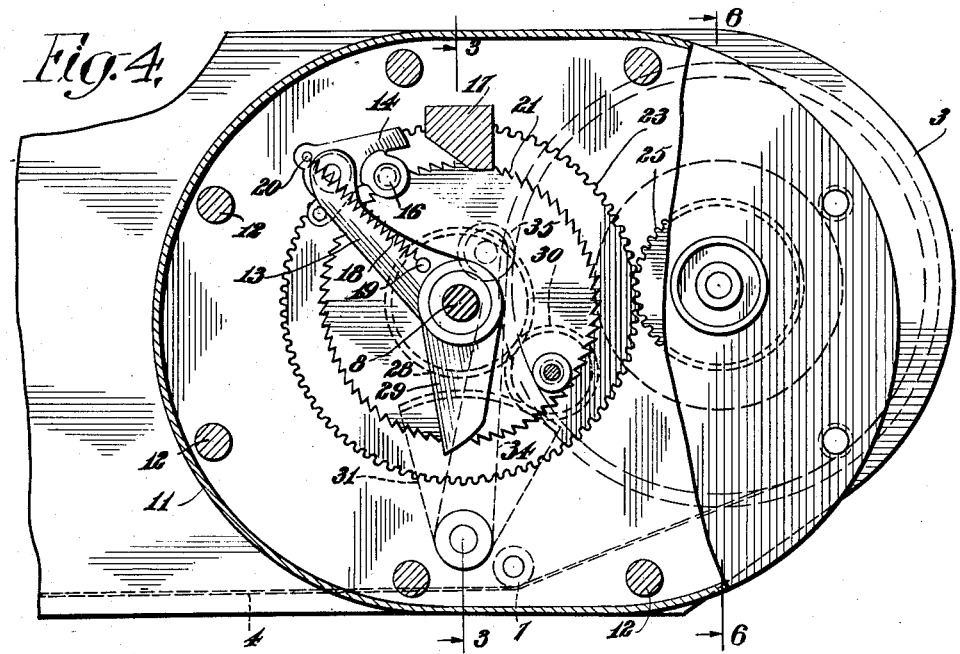
INVENTOR
Sherman M. Fairchild
BY
Kerr, Page, Cooper & Hayward
his ATTORNEYS Patented Jan. 12, 1926.

1,568,969

UNITED STATES PATENT OFFICE.

SHERMAN M. FAIRCHILD, OF ONEONTA, NEW YORK.

CAMERA.

Application filed October 11, 1919. Serial No. 330,066.

*To all whom it may concern:*

Be it known that I, SHERMAN M. FAIRCHILD, a citizen of the United States of America, residing at Oneonta, in the county of Otsego and State of New York, have invented certain new and useful Improvements in Cameras, of which the following is a full, clear, and exact description.

The present invention relates to web-feeding devices generally, and particularly to film-feeding mechanism for photographic cameras.

The chief object of the present invention is to provide a camera suitable for use in aeroplanes and the like which shall be automatic in passing the film through the field of exposure. To this end, the camera is provided (1) with a continuous source of power, say a rotating shaft, and mechanism intermediate the said shaft and the film reel or reels for intermittently operating the same to feed a portion of film at any time interval desired; and (2) mechanism co-operating with the film on the reels and the film feeding mechanism for insuring a uniform length of film at each feeding operation of the device.

A convenient and effective form of the invention is illustrated in the accompanying drawings in which—

Fig. 1 is a side elevation, partly in section, of a portion of the casing of my new camera;

Fig. 2 is an enlarged section of a part of the camera casing and operating mechanism taken along the line 2—2 of Fig. 1;

Fig. 3 is a cross section of the apparatus taken along the line 3—3 of Fig. 4;

Fig. 4 is a front elevation of the film feeding mechanism, and the casing therefor, showing the relative positions of the various parts near the beginning of the film supply;

Fig. 5 is a similar view, showing the relative positions of the various parts near the end of the film supply; and Fig. 6 is a view taken along the line 6—6 of Fig. 4, showing construction details of the reel drive.

Referring to the drawings, 1 is the camera casing in which are suitably mounted strip-film feeding and receiving reels or spools, 2 and 3, the sensitized strip film extending from reel 2 to reel 3, being shown at 4. The film 4 is passed across the focal plane or opening 5 of the camera, suitable rollers 6 and 7 being provided, one at each end of the opening, for holding the film in position across the opening.

A driving shaft 8 provided at its outer end with a coupling member 9 is connected to a suitable source of power such as a wind-motor (not shown) either direct or through suitable speed governing mechanism, as a gear case (not shown).

The shaft 8 is mounted in a bearing 10 in the wall of a casing 11 fastened to the camera casing 1 by rivets, screws or bolts, 12, 12. Attached to the shaft 8, at a right angle thereto and inside the casing 11, there is an arm 13 having a pawl 14 pivoted at 15 thereon. An offset lug 16 extends from said pawl 14 back toward the outer wall of the casing 11 and in its outermost position is in line with a stationary cam 17 fastened to the outer wall of said casing. At 18 is shown a spring one end of which is attached at 19 to the arm 13, and the other end of which is attached at 20 to the pawl 14.

The pawl 14 is in operative relation to a ratchet wheel 21, which in turn is bolted at 22 to a gear 23, the said ratchet and gear being connected to a sleeve 24 mounted on the inner wall of the casing 11. The gear 23 meshes with another gear 25 mounted on a sleeve 26, connected through the camera casing 1 to the receiving reel or spool 3. Another sleeve 27 intermediate the sleeve 24 and the shaft 8 extends into the camera casing 1 and carries on its inner end a gear 28, and on its outer end a cam 29. The sleeve 27 rests on the shaft 8, but does not rotate therewith, and the cam 29 is adjusted to position relative to the cam 17 by turning the sleeve 27 and the gear wheel 28 and then blocking the gear wheel. The gear 28 inside the casing 1 meshes with a smaller gear 30, which in turn meshes with the teeth on a sector 31, mounted on one end of an oscillating sleeve 32 pivoted at 33 to the inner wall of the casing 11. On the other end of the sleeve 32 there is an arm 34 extending towards the film 4 on the receiving spool 3, and carrying a roller 35 in contact with said film. A spring 36, coiled around the sleeve 30, is anchored to the arm 34 and the camera casing 1, and serves to hold the roller 35 against the film 4. The cam 29 in the outer casing 11 extends away from the sleeve 27 to a point where its outer end is in line with the offset lug 16 on the pawl 14 when in its innermost position. The gear wheel 25 and the sleeve 26 are shown in Fig. 6 mounted on a shaft 36 and fastened thereto by screws 37, 37, terminating in a slot 38 in said shaft 36. The outer end of the shaft 36 passes through a bearing 39 in the outer wall of the casing 11 and is provided with a knob 40, secured thereto by a pin 41. The inner end of the shaft 36 passes through a bearing 42 mounted in the casing 1 and is connected with the hub 43 of the reel 3, a spring 44 surrounding the shaft 36 and being interposed between the hub 43 and the remote wall of the bearing 42.

In operation, and when it is desired to take a picture or a series of pictures at definite intervals of time, the shaft 8 is set in motion by connecting it through the coupling 9 with a wind motor, or other suitable device of constant speed, or maintained at the desired speed through the agency of a suitable speed governing mechanism attached to the motor, or interposed between the driving device and the shaft 8. A wind motor and gear case (not shown) of the type used in aeroplanes for wireless purposes, is used in the present instance. The rotation of the shaft 8 causes the arm 13 and the pawl 14 thereon to move around the periphery of the ratchet wheel 21. When passing the cam 17 the lug 16 strikes the cam 17 and is forced downward, carrying the pawl 14 into engagement with the teeth of the ratchet wheel 21, causing the said ratchet wheel and the gear wheel 23 connected thereto to rotate with the arm 13, the spring 18 serving to hold the pawl 14 in engagement with the ratchet 21.

The rotation of the gear wheel 23 in turn causes the gear wheel 25 meshed therewith to revolve in the opposite direction, and the reel 3, to which the film 4 is attached, being connected to the gear 25, is turned about its axis and winds up the film thereon, thus drawing the film 4 across the focal opening 5, where it is exposed through the agency of cooperating shutter opening and closing mechanism (not shown) of well known construction, to take a picture or a series of pictures.

The above described operation continues until the arm 13 and the pawl 14 thereon travel around and are about to pass the cam 29, when the lug 16 strikes the said cam 29 and the pawl 14 attached thereto is forced out of engagement with the ratchet wheel 21, resuming its outermost position on the arm 13 and being held there by the spring 18, whereupon the rotation of the ratchet 21 and the connected spool moving mechanism ceases. When the pawl 14 reaches the cam 17 it is again forced into engagement with the ratchet 21 and the above described operations are repeated. The interval between successive operations can be varied by lengthening or shortening the distance between the cams 17 and 29, or for any given setting of said cams, by increasing or decreasing the speed of the shaft 8 and the arm 13. Each time the spool is turned to wind up the film, the diameter of the spool is increased, resulting in an increased portion of film being drawn across the focal opening 5 during successive operations.

In those instances where it is desired that a uniform length of film be exposed at each operation of the device, as in aerial photographing from aeroplanes and the like, the camera is equipped with mechanism connecting the film on the reel 3 and the cam 29 and serving to progressively decrease the distance between the cams 17 and 29 as the diameter of the film on the reel 3 is progressively increased by each operation of the film feeding mechanism, thereby increasing the range of photographic observation with a given amount of film.

When this is desired, the gear wheel 30 is interposed between the gear 28 and the gear sector 31 and the members 32, 34 and 35 are brought into play. As shown in Fig. 4, the cam 29 has been adjusted to position with relation to the cam 17 for exposing a given length of film at the first operation of the camera, and the roller 35 on arm 34 rests against the film on the reel 3.

As the film accumulates on the reel during each operation, the arm 34 and the gear sector 31 on the sleeve 32 are moved to the left, rotating the gear wheel 30 to the right. The rotation of gear 30 causes gear wheel 28 and sleeve 27 to rotate to the left, thus moving the cam 29 nearer to the cam 17. The movement of the cam 29 is interrupted by the pawl 14 coming into contact therewith and being thrown out of engagement with the ratchet 21. Thereafter, the successive film winding operations described above proportionately decrease the distance between the cams, as illustrated in Fig. 5, where the relative positions of the arm 34 and the cams 29 and 17 are shown near the end of the series of operations..

While I have shown and described my invention as applied to the storing or take-up reel of a camera, it is to be understood that it is equally effective when applied to the supply reel, in which case the take-up reel may be driven through a slip-clutch, permitting said reel to rotate and draw film from the supply reel only when the latter is released by the controlling mechanism and is therefore free to rotate. It is also to be understood that the invention is not limited to cameras but can be used to advantage for other purposes as well.

What I claim is:

1. In a camera, in combination, a reel containing an unexposed film strip, a reel for receiving the film after exposure, a continuously operating motive device for said reels, and means controlled by said reels for regulating the length of film exposed in each operation of the reels.

2. In a camera, a reel containing an unexposed film strip, a reel for receiving the film after exposure, a continuously operating motive device for said reels, and means controlled by said film for intermittently exposing a portion of the film.

3. In a camera, a reel containing an unexposed film strip, a reel for receiving the film after exposure, a continuously operating motive device for said reels, and automatic means controlled by said film for intermittently exposing a portion of the film.

4. In a camera, the combination with film supply and storing reels, and a continuously operating motive device for said reels, of means controlled by said reels for intermittently connecting said reels and said motive device.

5. In a camera, the combination with film supply and storing reels, a rotating shaft mounted in said camera, and a train of gears connected to said reels, of means controlled by said reels for intermittently connecting said reels to the rotating shaft.

6. In a camera, the combination with film supply and storing reels, and a continuously operating motive device therefor, of means for intermittently connecting said motive device with said reels, and means controlled by the film on the reels for insuring the exposing of a uniform length of film at each operation of the reels.

7. In a camera, the combination with film supply and storing reels, and a continuously operating motive device therefor, of means for intermittently connecting and disconnecting said motive device with said reels, and means controlled by the diameter of one of said reels for insuring the exposing of a uniform length of film at each operation of the reels.

8. In a camera, the combination with film supply and storing reels, and a continuously operating motive device therefor, of means for intermittently operating said reels, and automatic means for maintaining a uniform length of film exposure at each operation of the reels.

9. In a web feeding device, a supply reel containing material wound thereon, a take-up reel therefor, and a continuously operating motive device therefor, and means controlled by the material on the reels for intermittently feeding a portion of said material from the first named reel to the other reel.

10. In a web feeding device, a supply reel containing material wound thereon, a take-up reel therefor, and a continuously operating motive device therefor, and means controlled by the material on the reels for intermittently feeding a uniform length of said material.

11. In a web feeding device, a supply reel containing material wound thereon, a take-up reel for said material, and a continuously operating motive device for said reels, means for intermittently connecting said reels and said motive device, and means controlled by the diameter of one of said reels for feeding a uniform length of material at each operation of the reels.

12. In a camera, the combination with film supply and storing reels, a motive device for one of said reels, and a movable pawl connected to said motive device, of a pair of cams in the path of movement of said pawl and serving to move said pawl to intermittently connect and disconnect said reels and said motive device.

13. In a camera, the combination with film supply and storing reels, and a motive device for one of said reels and a movable pawl mounted on said motive device, of a stationary cam and a movable cam in the path of movement of said pawl and serving to move said pawl to intermittently connect and disconnect said reels and said motive device, and means responsive to diameter variations of said reels for moving one of said cams to vary the distance between said cams.

14. In a camera, the combination with film supply and storing reels, and a motive device for one of said reels, of a train of gears for moving said reels, a rotating arm connected to said motive device, a pawl mounted on said rotating arm, and a pair of cams in the path of movement of said pawl and serving to force said pawl into and out of engagement with said gears.

15. In a camera, the combination with film supply and storing reels, and a motive device for one of said reels, of a train of gears for moving said reels, a rotating arm connected to said motive device, a pawl mounted on said rotating arm, a pair of cams in the path of movement of said pawl and serving to force said pawl into and out of engagement with said gears, and a movable arm in contact with the film on said reels and connected with one of said cams for varying the distance between the cams in accordance with variations of diameter of said reels whereby a uniform length of film is fed at each operation of the reels.

16. In combination, web supply and storing reels, a motive device for one of said reels, a train of gears for moving said reels, a rotating arm connected to said motive device, a pawl mounted on said rotating arm, and a pair of cams in the path of movement of said pawl and serving to intermittently force said pawl into and out of engagement with said gears.

17. In combination, web supply and storing reels, a motive device for one of said reels, a train of gears for moving said reels, a rotating arm connected to said motive device, a pawl mounted on said rotating arm, a pair of cams in the path of movement of said pawl and serving to intermittently force said pawl into and out of engagement with said gears, and a movable arm in contact with the material on said reels and connected with one of said cams for varying the distance between the cams in accordance with variations of diameter of said reels whereby a uniform length of material is fed at each operation of the reels.

In testimony whereof I hereunto affix my signature.

SHERMAN M. FAIRCHILD.